US012644559B2

(12) United States Patent
Coleiro et al.

(10) Patent No.: US 12,644,559 B2
(45) Date of Patent: Jun. 2, 2026

(54) COUPLING DEVICE, AND METHOD FOR FLUSHING SAME

(71) Applicant: L'Air Liquide, Societe Anonyme pour l'Etude et l'Exploitation des Procedes Georges Claude, Paris (FR)

(72) Inventors: Gaetan Coleiro, Sassenage (FR); Louis Bizel, Sassenage (FR); Yan Pennec, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 8 days.

(21) Appl. No.: 18/729,659

(22) PCT Filed: Nov. 23, 2022

(86) PCT No.: PCT/EP2022/082954
§ 371 (c)(1),
(2) Date: Jul. 17, 2024

(87) PCT Pub. No.: WO2023/134912
PCT Pub. Date: Jul. 20, 2023

(65) Prior Publication Data
US 2025/0092975 A1      Mar. 20, 2025

(30) Foreign Application Priority Data
Jan. 17, 2022    (FR) ...................................... 2200343

(51) Int. Cl.
F16L 59/18 (2006.01)
F16L 29/04 (2006.01)
(Continued)

(52) U.S. Cl.
CPC ............. F16L 59/184 (2013.01); F16L 29/04 (2013.01); F16L 39/005 (2013.01); F16L 59/065 (2013.01); F16L 59/141 (2013.01)

(58) Field of Classification Search
CPC ..... F16L 59/184; F16L 59/188; F16L 59/141; F16L 59/065; F16L 29/04; F16L 37/32;
(Continued)

(56) References Cited

U.S. PATENT DOCUMENTS 3,068,026 A * 12/1962 Mckamey ............. F16L 39/005
62/50.7
3,207,533 A * 9/1965 Richards ............... F16L 59/065
285/31
(Continued)

FOREIGN PATENT DOCUMENTS

EP      3 321 229      5/2018
EP      3321229 A1 * 5/2018 ............ F16L 59/185
(Continued)

OTHER PUBLICATIONS

International Search Report and Written Opinion for PCT/EP2022/082954, mailed Feb. 8, 2023.
French Search Report for FR 2 200 343, mailed Aug. 2, 2022.

Primary Examiner — David Colon-Morales
(74) Attorney, Agent, or Firm — Elwood L. Haynes

(57) ABSTRACT

A self-closing emergency coupling and detachment device for transporting cryogenic fluid, including two fluid transport pipes that extend in a longitudinal direction and each include, at a connection end, a valve mechanism configured to automatically close the pipe when the connection ends are separated and allow the pipe to be opened when the connection ends are coupled together, the device also including an outer tube that is arranged around each transport pipe and delimits a vacuum space for thermally insulating the transport pipe, the device being configured to delimit a defined
(Continued)

sealed dead volume between the coupled connection ends, wherein the device includes a system for draining the dead volume, the draining system being provided with a fluid circuit that is fluidically connected to the dead volume.

14 Claims, 4 Drawing Sheets

(51) Int. Cl.
    *F16L 39/00*     (2006.01)
    *F16L 59/065*    (2006.01)
    *F16L 59/14*     (2006.01)

(58) Field of Classification Search
    CPC ..... F16L 37/36; F16L 39/005; F16L 55/1015; F16L 2201/20
    See application file for complete search history.

(56)             References Cited

U.S. PATENT DOCUMENTS

| | | | | |
|---|---|---|---|---|
| 3,280,849 | A * | 10/1966 | Rendos | F16L 59/14 285/47 |
| 4,512,369 | A * | 4/1985 | Takahashi | F16L 37/35 137/614.04 |
| 4,932,810 | A * | 6/1990 | Austin | F16L 58/00 405/184 |
| 5,253,675 | A * | 10/1993 | Ooshio | F16L 39/005 62/50.7 |
| 6,082,400 | A * | 7/2000 | Tocha | F16L 39/00 62/50.7 |
| 7,052,047 | B1 * | 5/2006 | Box | F16L 59/184 62/50.7 |
| 7,137,651 | B2 * | 11/2006 | Bonn | F16L 59/065 285/123.1 |
| 7,399,002 | B2 * | 7/2008 | Motew | F16L 27/11 285/123.3 |
| 7,854,236 | B2 * | 12/2010 | Jibb | F16L 59/065 285/47 |
| 8,122,914 | B2 * | 2/2012 | Menardo | F16L 59/187 138/148 |
| 8,267,433 | B2 * | 9/2012 | Lange | F16L 39/005 62/50.7 |
| 8,517,749 | B2 * | 8/2013 | Marshall | F16L 39/005 62/50.7 |
| 9,546,759 | B2 * | 1/2017 | Van Tassel | F17C 13/004 |
| 9,982,361 | B2 * | 5/2018 | Chartier | C30B 11/02 |
| 10,591,105 | B2 * | 3/2020 | Takami | F16L 59/075 |
| 10,935,177 | B2 * | 3/2021 | Lillesköld | F16L 55/1007 |
| 11,047,517 | B2 * | 6/2021 | Vaze | F16L 53/32 |
| 11,079,051 | B2 * | 8/2021 | Kawai | F16L 39/005 |
| 11,390,457 | B2 * | 7/2022 | Young | F17C 13/04 |
| 11,525,538 | B2 * | 12/2022 | Schulz | F16L 59/188 |
| 11,608,263 | B2 * | 3/2023 | Umemura | F16L 39/04 |
| 11,788,666 | B2 * | 10/2023 | Schulz | F16L 59/184 285/47 |
| 11,815,212 | B2 * | 11/2023 | Umemura | B67D 7/3218 |
| 12,007,050 | B2 * | 6/2024 | Richardson | F16L 29/04 |
| 12,123,540 | B2 * | 10/2024 | Coleiro | F16L 59/065 |
| 12,331,884 | B2 * | 6/2025 | Gustafson | F16L 59/141 |
| 2009/0123221 | A1 | 5/2009 | Marshall | |
| 2009/0261578 | A1 | 10/2009 | Lange et al. | |
| 2015/0285421 | A1 * | 10/2015 | Bleyer | F16L 39/005 285/123.15 |
| 2018/0224034 | A1 * | 8/2018 | Kawai | F16L 29/04 |
| 2020/0182389 | A1 * | 6/2020 | Frère | F16K 15/063 |
| 2024/0084941 | A1 * | 3/2024 | Coleiro | F16L 23/12 |
| 2024/0117911 | A1 * | 4/2024 | Coleiro | F16L 39/005 |

FOREIGN PATENT DOCUMENTS

| | | | | |
|---|---|---|---|---|
| EP | 3 581 839 | | 12/2019 | |
| FR | 3125321 A1 * | | 1/2023 | F16L 59/18 |
| JP | S60 91889 | | 6/1985 | |
| JP | S6091889 U * | | 6/1985 | |
| JP | 2016070374 A * | | 5/2016 | |

* cited by examiner

[Fig. 1]
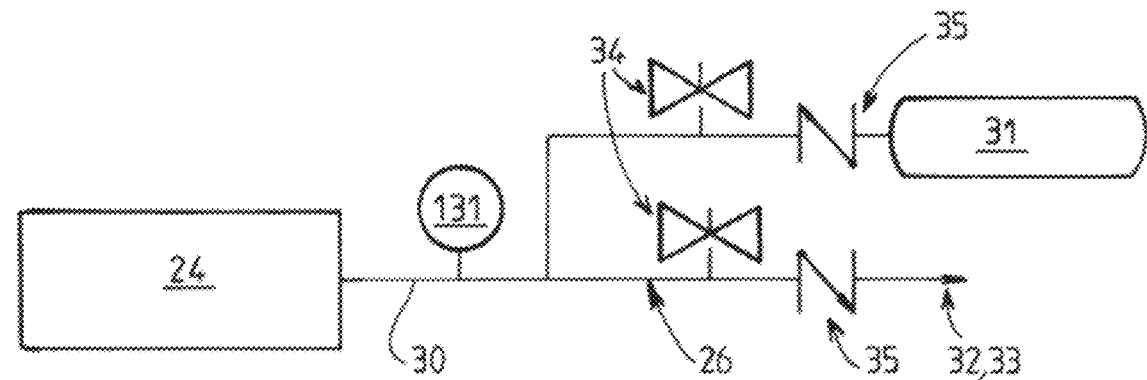
[Fig. 2]
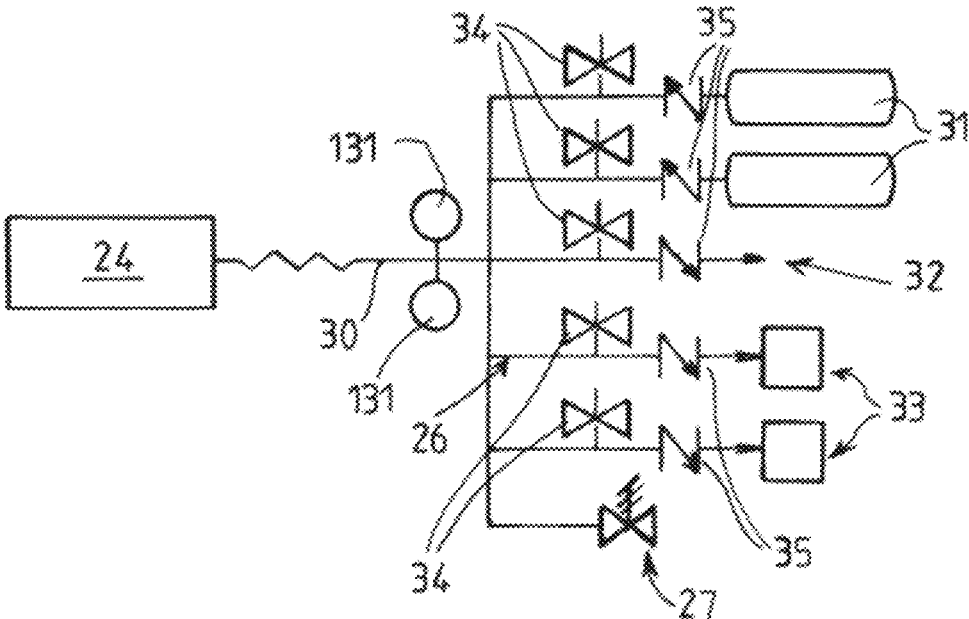

[Fig. 3]
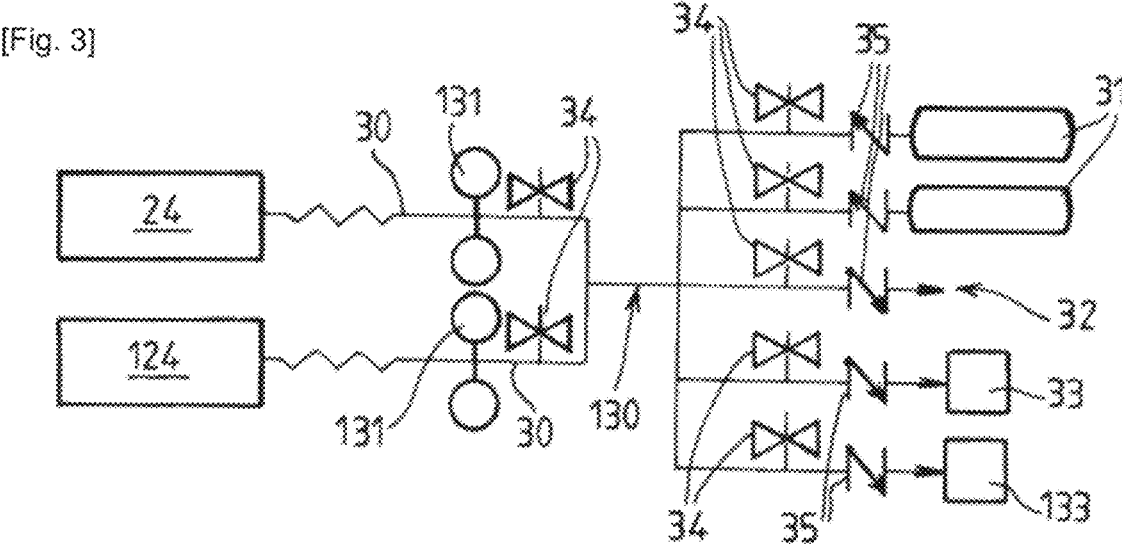
[Fig. 4]
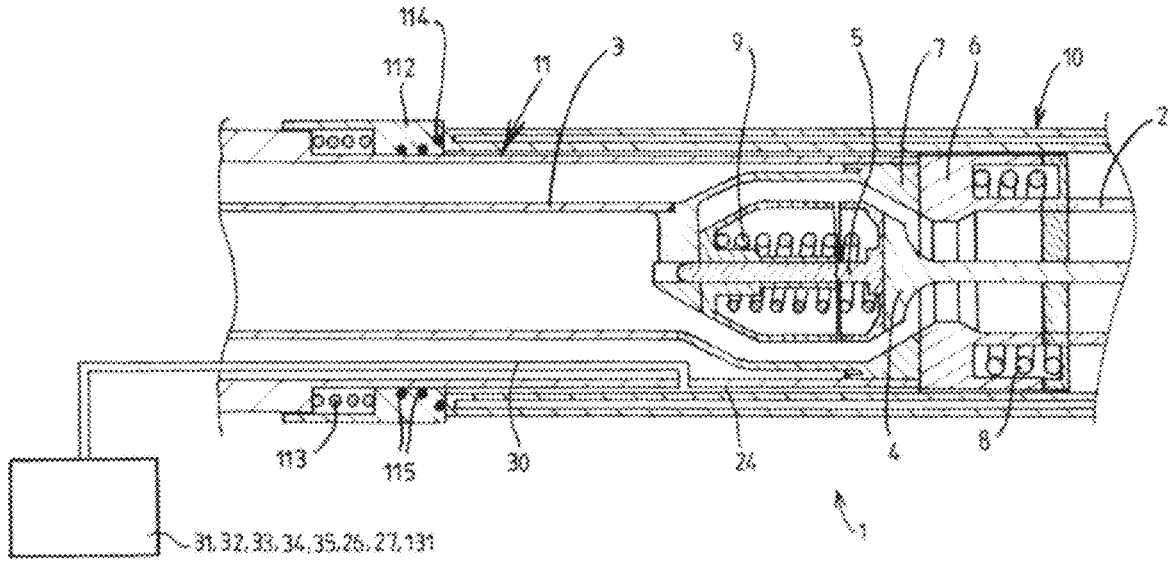

[Fig. 5]
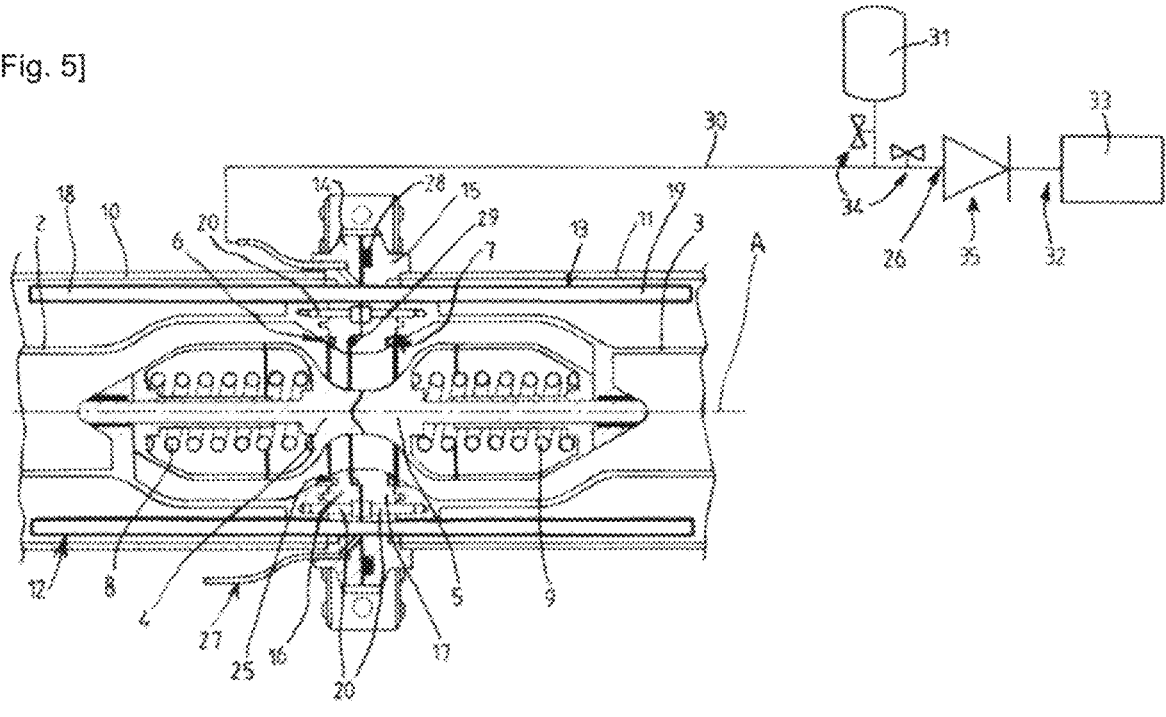
[Fig. 6]
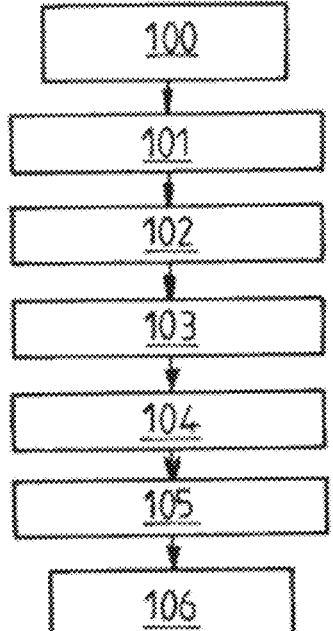

[Fig. 7]

| 107 |

| 108 |

| 102 |

| 104 |

| 109 |     | 119 |

| 110 |     | 120 |

| 111 |     | 110 |

| 111 |

COUPLING DEVICE, AND METHOD FOR FLUSHING SAME

CROSS-REFERENCE TO RELATED APPLICATIONS

This application is a § 371 of International PCT Application PCT/EP2022/082954, filed Nov. 23, 2022, which claims § 119(a) foreign priority to French patent application FR 2200343, filed Jan. 17, 2022.

BACKGROUND

The invention relates to a coupling device and to the method for purging same.

FIELD OF THE INVENTION

The invention relates more particularly to a self-closing emergency coupling and release device for the transport of cryogenic fluid, comprising two fluid transport pipes extending in a longitudinal direction and each comprising, at a connection end, a valve mechanism configured to automatically close the pipe when the connection ends are separated and to open the pipe when the connection ends are coupled, the device further comprising an outer tube that is disposed around each transport pipe and defines a space under vacuum for thermal insulation of the transport pipe, the device being configured to delimit a determined fluid-tight dead volume between the coupled connection ends.

RELATED ART

Different types of connections can be used to transfer cryogenic fluids.

In the case of portions which are connected without shut-off means, that is to say without valves (for example of the "Johnston" type), the line has to be purged before the transfer of fluid is carried out so as to not degrade the purity of the fluid or create a dangerous mixture or so as to not accumulate an undesired fluid (liable to liquefy or solidify). Cf. for example US20090261578A1.

To overcome these problems and also the risk of fluid loss, it is known to use rapid coupling devices provided with valves which render the two separate line portions fluid-tight when they are disconnected.

These devices have to manage any space between the two ends when the fluid-tight coupling is affected. The need to purge the line can be reduced or eliminated, however the use of (self-) closing connectors for cold connections/disconnections tends to pose an additional problem due to the temporal proximity between the connection and the start of the fluid transfer. Specifically, the valve mechanisms can stay cold during their use and therefore can be subject to ice deposits. This can generate blockages (impossibility of connection/disconnection), leaks (non-fluid-tight valves) or safety problems.

In addition, the valve mechanisms can leak.

SUMMARY OF THE INVENTION

An aim of the present invention is to overcome all or some of the drawbacks of the prior art that are set out above.

To this end, the device according to the invention, which is otherwise in accordance with the generic definition thereof given in the above preamble, is essentially characterized in that the device comprises a system for purging the dead volume, the purge system comprising a fluidic circuit fluidically connected to said dead volume.

Furthermore, embodiments of the invention may have one or more of the following features:

the fluidic circuit of the purge system comprises a transfer pipe having an end leading into the dead volume, at least one reservoir of pressurized purging and/or inerting gas connected to the transfer pipe and configured to supply gas to the dead volume, the purge system comprising a discharge means for the gas, the gas discharge means comprises at least one from among: a vent connected to a recovery zone, for example the atmosphere, a system for evacuating the dead volume, for example a vacuum pump, a gas analysis unit, a fluid transfer channel comprising an end leading into said dead volume, the fluidic circuit of the purge system comprises a set of one or more flow-control valves and/or a set of one or more valves, notably one or more check valves, the fluidic circuit of the purge system comprises a safety valve configured to discharge any overpressure beyond a determined threshold in the dead volume, the fluidic circuit of the purge system comprises a pressure sensor and/or a spectrometer, when the connection ends are fluid-tightly coupled with the sets of valves closed, the purge system is configured to purge the dead volume via the gas discharge means, after purging of the dead volume via the gas discharge means, the purge system is configured to fill the dead volume with pressurized gas from the gas in the reservoir and then measure the leakage rate and/or the pressure of the dead volume, the purge system is configured to pressurize the dead volume with inert gas from the reservoir, the dead volume is located between the fluid-tightly coupled connection ends of the transport pipes and the fluid-tightly coupled outer tubes, the device comprises a thermal insulation chamber at each connection end, the volume of each thermal insulation chamber being delimited by tubular walls that extend longitudinally and are spaced apart transversely, a first end of the volume of each thermal insulation chamber located at the connection end being open, the opposite second longitudinal end being closed, the open first ends of the two thermal insulation chambers being configured to be fluid-tightly connected to one another and to form a single fluid-tight, closed insulation volume when the connection ends are coupled, this insulation volume forming part of or constituting the dead volume, the dead volume has a volume of between 1 and 1000 cm$^3$, the valve mechanism comprises a valve urged toward a closed position against a seat by a return member, when the connection ends are coupled, the ends of the two outer tubes are fluid-tightly connected and the ends of the two transport pipes are fluid-tightly connected, the terminal ends of the valves of the two transport pipes are configured to come into contact and mechanically push one another back out of the respective seats, counter to the return members, when the connection ends are coupled in a determined relative longitudinal position, the valve mechanism of one of the two transport pipes is housed inside its outer tube to a relatively more recessed extent than the other valve mechanism is in its tube, so as to form a male/female system in which, in the joined position of the two transport pipes, one connection end enters the other connection end, the space under vacuum between the outer tube and the transport pipe comprises a multilayer thermal insulator, "MLI", when passing from a separated position to the coupled position of the two connection ends, the valve mechanisms are configured to pass sequentially from a first configuration to a second configuration, in the first configuration the connection ends are in fluid-tight contact and the two valve mechanisms are closed, in the second configuration the connection ends are in fluid-tight contact and the valve mechanisms are opened by mutual actuation, the passage from the first configuration (valve mechanisms closed) to the second configuration (valve mechanisms open) may be effected by a relative movement of the two fluid transport pipes toward one another and/or a relative movement of the two valve mechanisms toward one another, for example manually and/or under the control of a control member, before the step of opening the two valve mechanisms, the sequence may have a stable intermediate configuration in which the two connection ends are fluid-tightly coupled with respect to the outside and the two valve mechanisms are in the closed position, the step of opening the two valve mechanisms being effected via an additional relative movement of the two fluid transport pipes toward one another and/or a relative movement of at least part of the two valve mechanisms, the closure of the two valve mechanisms may be obtained via a relative movement of the two fluid transport pipes away from one another and/or a relative movement of at least part of the two valve mechanisms, this closure may be followed by a step of separating the two connection ends, between the step of closing the two valve mechanisms and the separation step, the device may also pass through a stable intermediate configuration in which the two connection ends remain fluid-tightly coupled with respect to the outside and the two valve mechanisms are in the closed position, the step of closing the two valve mechanisms being able to be effected via an additional relative movement of the two fluid transport pipes away from one another and/or a relative movement of at least part of the two valve mechanisms, the coupling method may comprise a step of moving the two connection ends toward one another, in which the two connection ends are fluid-tightly coupled with respect to the outside, a step of bringing the two valve mechanisms into contact, a step of opening two valve mechanisms and a step of circulating cryogenic fluid from one pipe to the other.

The invention also relates to a method for purging a coupling device according to any one of the features above or below, comprising the following steps:

fluid-tightly coupling connection ends with the sets of valves closed, thus forming the dead volume, then purging the dead volume via the discharge means for pressurized gas contained in the dead volume toward a vent and/or pumping gas into the dead volume, then filling the dead volume with a purging gas.

According to other possible particular features:

the purging and filling steps are repeated so as to carry out several expansion/compression cycles in the dead volume, the method comprises a step of pressurizing the dead volume to a determined level during filling and a step of measuring the tightness of the dead volume, for example measuring a leakage rate by a measurement of the pressure and/or by way of a spectrometer.

The invention may also relate to a method for purging a coupling device according to any one of the features above or below, comprising the following steps:

closing the sets of valves of the fluid-tightly coupled connection ends, then purging the dead volume via the discharge means for pressurized gas contained in the dead volume toward a vent and/or pumping gas into the dead volume, then measuring the tightness of the dead volume, for example measuring a leakage rate by pressure measurement and/or by way of a spectrometer.

In the event of measurement of a tightness greater than a threshold, the sets of valves can be opened to transfer the fluid.

According to other possible particular features:

when the tightness is greater than a determined threshold, the method comprises the following steps: inerting the dead volume by venting the dead volume and/or filling the dead volume with an inert gas; separating the connection ends, when the tightness is lower than a determined threshold, the method comprises the following steps: taking a corrective action for the tightness and then inerting the dead volume by venting the dead volume and/or filling the dead volume with an inert gas, for example helium, then separating the connection ends, the dead volume is filled with a purging gas of the same nature as the cryogenic fluid intended to be transported in the transport pipes, for example the purging gas is hydrogen gas when the cryogenic fluid transported is liquid hydrogen.

BRIEF DESCRIPTION OF THE FIGURES

The invention may also relate to any alternative device or method comprising any combination of the features above or below within the scope of the claims.

Further particular features and advantages will become apparent on reading the following description, which is provided with reference to the figures, in which:

FIG. 1 shows a schematic, partial view illustrating, in simplified form, one example of the structure and operation of a device according to a first embodiment, FIG. 2 shows a schematic, partial view illustrating, in simplified form, one example of the structure and operation of a device according to a second embodiment, FIG. 3 shows a schematic, partial view illustrating, in simplified form, one example of the structure and operation of a device according to a third embodiment, FIG. 4 shows a schematic, partial view in longitudinal section illustrating one example of the structure and operation of a device according to a fourth embodiment, FIG. 5 shows a schematic, partial view in longitudinal section illustrating one example of the structure and operation of a device according to a fifth embodiment, FIG. 6 shows a schematic, partial view illustrating one example of the operation for purging and coupling such a device, FIG. 7 shows a schematic, partial view illustrating one example of the operation for purging and separating such a device.

FIG. 4 and FIG. 5 each describe an example of a self-closing coupling and release device 1 for the transport of cryogenic fluid.

DETAILED DESCRIPTION OF THE INVENTION

The device 1 comprises two fluid transport pipes 2, 3 extending in a longitudinal direction and each comprising, at a connection end, a valve mechanism 4, 6, 8; 5, 7, 9 configured to automatically close the pipe when the connection ends are separated (self-closing) and to open (automatically or in controlled fashion) the pipe when the connection ends are coupled.

The device 1 further comprises an outer tube 10, 11 that is disposed around each transport pipe 2, 3 and defines a space for thermal insulation of the transport pipe 2, 3. The tube 10, 11 delimits a spacing, preferably under vacuum and thermally insulated, around the transport pipe 2, 3. This space under vacuum between the outer tube 10, 11 and the transport pipe 2, 3 comprises, for example, a multilayer thermal insulator, "MLI".

The device 1 is configured to delimit a determined fluid-tight dead volume 24 between the connection ends when they are coupled.

The dead volume 24 is preferably located between the fluid-tightly coupled connection ends of the transport pipes 2, 3 and the fluid-tightly coupled ends of the outer tubes 10, 11. This dead volume 24 may have a volume of between 1 and 500 cm$^3$, for example. This dead volume can trap gas during the connection and/or fluid in the event of leakage at the valve mechanisms.

The device 1 comprises a system for purging the dead volume 24, several variants of which will be described below. The purge system in particular comprises a fluidic circuit 30, 26 fluidically connected to said dead volume 24.

As schematically shown, the fluidic circuit of the purge system may comprise a transfer pipe 30 having an end leading into the dead volume 24, and at least one reservoir 31 of pressurized purging and/or inerting gas connected to the transfer pipe 30 and configured to supply gas to the dead volume 24, the purge system comprising a discharge means 32, 33 for the gas.

The gas discharge means 32, 33 may comprise at least one from among: a vent 32 connected to a recovery zone, for example the atmosphere, a system for evacuating the dead volume 24, for example a vacuum pump, a gas analysis unit 133, a fluid transfer channel 26 comprising an end leading into said dead volume 24.

The fluidic circuit 30, 26 of the purge system preferably further comprises a set of one or more flow-control valves 34 and/or a set of one or more valves 35, notably one or more check valves.

In the example schematically shown in FIG. 1, a reservoir 31 of purging gas and a vent 32 (or a vacuum pump) are connected in parallel to the dead volume 4 via the respective flow-control valves 34 and check valves that are disposed in series in each line.

As illustrated, a pressure sensor 131 may be provided in order to measure the pressure in the circuit, for example in the transfer pipe 30 (part common to the two parallel branches).

In the example schematically shown in FIG. 2, the circuit comprises six branches connected in parallel to the end of the transfer pipe 30 connected to the dead volume 24 (preferably via a respective flow-control valve 34 and a respective check valve 35). The first five branches (from top to bottom in the non-limiting exemplary representation) may comprise respectively a reservoir 31 of purging gas, a reservoir 31 of inerting gas, a vent 32, a vacuum pump 33, a spectrometer (allowing more precise monitoring of the leakage rate). The sixth branch may comprise a safety valve 27 configured to discharge a determined overpressure (this makes it possible to avoid an abnormal overpressure in the circuit and in the dead volume 24). Of course, in another variant, one or more of these branches in parallel could be omitted. As illustrated, a pressure and/or temperature sensor 131 may be provided in order to measure the pressure (and/or the temperature) in the circuit, for example in the transfer pipe 30 (part common to the two parallel branches).

In the example schematically shown in FIG. 3, the device 1 comprises two dead volumes 24, 124. These two dead volumes 24, 124 may belong to the same connection device or respectively to two separate connection devices. For example, the two dead volumes belong respectively to a system for coupling two pipes and to another coupling system. The two dead volumes 24, 124 may be connected in parallel (via respective flow-control valves 34) to a common line 130 to which several branches (five in this example) are connected in parallel. The branches may comprise a flow-control valve 34 and a check valve 35 in series and respectively: a reservoir 31 of purging gas, a reservoir 31 of inerting gas, a vent 32, a vacuum pump 33, a spectrometer (a safety valve may also be provided).

Thus, when the connection ends are fluid-tightly coupled with the sets of valves closed, the purge system may be configured to purge the dead volume 24 via the gas discharge means 32, 33 (vacuum pump, for example).

In addition, after purging of the dead volume 24 via the gas discharge means 32, 33, the purge system may be configured to fill the dead volume 24 with pressurized gas from the gas in the reservoir 31 and then measure the leakage rate and/or the pressure of the dead volume 24.

The purge system may also be configured to pressurize the dead volume 24 with inert gas from the reservoir 31.

For example, during a coupling 100 of the two transport pipes 2, 3, the following sequence may be carried out (cf. FIG. 6):

fluid-tightly connecting 101 the two ends which nevertheless remain closed by the sets of valves, thus forming a dead volume 24, purging 102 the dead volume 24, this purging may be carried out by a simple vent (venting of the dead volume) and/or by pumping via a vacuum pump or other pump, filling 103 the dead volume 24 with purging gas. This purging gas is preferably of the same nature as the fluid transported through the transport pipes 2, 3 (for example hydrogen gas if the fluid transported is liquid hydrogen). The value of the purging pressure will also preferably not exceed the minimum pressure of the lines (downstream of the valves of the sets of valves shutting off the transport pipes), pressurizing 104 the dead volume and measuring leakage at the connection. This leakage measurement may be carried out using a pressure sensor 131 by comparing the value with a threshold limit and/or using a spectrometer 133, and, if the leakage is in compliance (correct tightness), opening 105 the sets of valves, the transfer 106 of fluid is effective in a safe manner.

It should be noted that, in the event of leakage that is not in compliance, a corrective action for the tightness may be provided between 104 and 105.

It should be noted that the purging 102 and filling 103 steps may be repeated so as to carry out several expansion/compression cycles in the circuit and in the dead volume 24.

Figure 7:
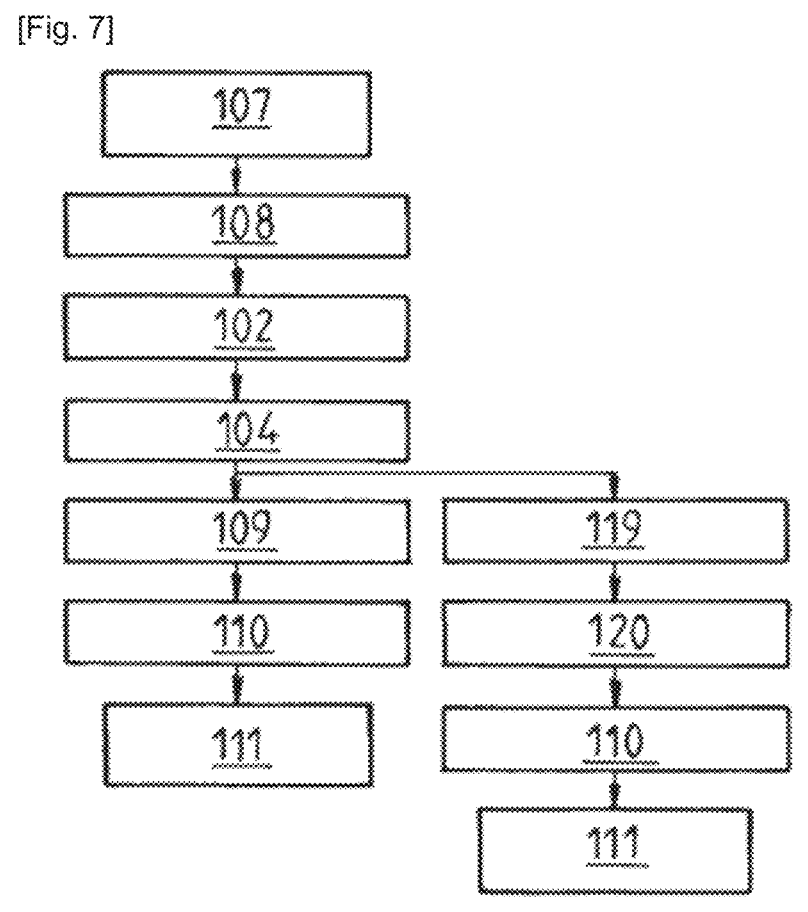

To separate 107 two transport pipes 2, 3 (after a transfer of fluid), the following sequence may be carried out (cf. FIG. 7):

closing 108 the sets of valves, purging 102 the dead volume 24, this purging may be carried out by a simple vent (venting of the dead volume) and/or by pumping via a vacuum pump, measuring/detecting 104 leakage at the connection (measuring any leakage at the valves). This leakage measurement may be carried out using a pressure sensor 131 by comparing the value with a threshold limit and/or using a spectrometer 133, if no abnormal leakage is detected 109, inerting 110 the dead volume 24. This inerting may be carried out via venting of the dead volume 24 and/or by filling the dead volume 24 with an inert gas. In certain cases, venting (with atmospheric or dry air) may be sufficient. If the fluid transported is hydrogen, the inert gas is preferably helium (so as to avoid explosion or icing risks), the two pipe ends may be separated 111 in complete safety.

However, if the step of detecting leakage concludes with an unacceptable leak 119, the method preferably comprises a corrective action such as a verification/correction of proper closure of the valves. After this corrective step 120, the inerting 110 can be carried out and then the separation (or disconnection) 107 as described above. This may be the same during a coupling.

Thus, the device and its use enable the management of the purging of the dead volume 24 of a device for connecting two entities for transferring a cryogenic fluid.

The invention thus enables the monitoring of the tightness of the connection before the opening of the valves, and the monitoring of the tightness of the valves after their closure and before the disconnection 111.

The invention can apply to any coupling devices having a dead volume, notably with a dead volume of between 1 and 1000 cm³, notably of 10 to 500 cm³ and in particular between 50 and 200 cm³.

FIG. 4 and FIG. 5 illustrate two non-limiting examples of coupling devices 1.

As illustrated, the valve mechanism 4, 6, 8; 5, 7, 9 may comprise, at each end, a valve 4, 5 urged toward a closed position against a seat 6, 7 by a return member 8, 9, such as a spring.

The ends may comprise a set of flanges 14, 15, 16, 17 (for example mounted via shafts 20) and/or seals 25, 28, 29, 114, 115 configured to fluid-tightly connect the ends of the transport pipes 2, 3 and the ends of the outer tubes 10, 11.

The terminal ends of the valves 4, 5 of the two transport pipes 2, 3 may be configured to come into contact and mechanically push one another back out of the respective seats, counter to the return members 5, 9, when the connection ends are coupled in a determined relative longitudinal position.

As illustrated in FIG. 4, the valve mechanism 4, 6, 8 of one of the two transport pipes 2 may be housed inside its outer tube 10 to a relatively more recessed extent than the other valve mechanism 5, 7, 9 is in its tube 11, so as to form the male/female system in which, in the joined position of the two transport pipes 2, 3, one connection end enters the other connection end.

When passing from a separated position to the coupled position of the two connection ends, the valve mechanisms may be configured to pass sequentially from a first configuration to a second configuration, in the first configuration the connection ends are in fluid-tight contact and the two valve mechanisms are closed, in the second configuration the connection ends are in fluid-tight contact and the valve mechanisms are opened by mutual actuation.

The passage from the first configuration (valve mechanisms closed) to the second configuration (valve mechanisms open) may be effected by a relative movement of the two fluid transport pipes 2, 3 toward one another and/or a relative movement of the two valve mechanisms 4, 6, 8, 5, 7, 9 toward one another, for example manually and/or under the control of a control member.

In the example in FIG. 4, the connection end of a first one 3 of the two pipes comprises a sealing ring 112 secured to the outer tube 11.

The sealing ring 112 comprises a set of one or more seals 114, 115 configured to ensure tightness with respect to the outside between the two connection ends when the two connection ends are coupled. This sealing ring 112 is for example mounted so as to be movable in translation in the longitudinal direction relative to the outer tube 111 between two separate positions during the passage from the first, closed configuration to the second, open configuration.

The device preferably comprises a return member 113, for example a spring, notably a compression spring, which urges the sealing ring 112 toward its first position.

The sealing ring 112 comprises an internal face provided with at least one seal 115 (and preferably at least two seals 115) which sealingly cooperates with the tube 11 to which the sealing ring 112 is secured.

The sealing ring 112 further comprises a terminal face or end intended to bear against the other connection end in the coupled position. This terminal face is preferably provided with at least one seal 114 intended to sealingly cooperate with the other connection end when the two connection ends are coupled.

Thus, the sealing ring 112 produces (or contributes to) the fluid-tight connection between the two coupled connection ends (with the seals 114, 115) and enables or does not enable an additional relative movement of the two sets of valves toward one another in order to induce the opening or not.

Thus, before the opening of the two valve mechanisms 4, 6, 8, 5, 7, 9, a stable intermediate configuration may be possible in which the two connection ends are fluid-tightly coupled with respect to the outside and the two valve mechanisms 4, 6, 8, 5, 7, 9 are in the closed position. The step of opening the two valve mechanisms 4, 6, 8, 5, 7, 9 may be carried out via an additional relative movement of the two fluid transport pipes 2, 3 toward one another and/or a relative movement of at least part of the two valve mechanisms. The closure of the two valve mechanisms 4, 6, 8, 5, 7, 9 may be obtained by a relative movement of the two fluid transport pipes 2, 3 away from one another and/or a relative movement of at least part of the two valve mechanisms.

This means that, between the step of closing the two valve mechanisms 4, 6, 8, 5, 7, 9 and the separation step, the device may also pass through a stable intermediate configuration in which the two connection ends remain fluid-tightly coupled with respect to the outside and the two valve mechanisms 4, 6, 8, 5, 7, 9 are in the closed position. The purging operations and other operations can be carried out in this configuration.

The step of closing the two valve mechanisms 4, 6, 8, 5, 7, 9 may be carried out via an additional relative movement of the two fluid transport pipes 2, 3 away from one another and/or a relative movement of at least part of the two valve mechanisms.

In the embodiment in FIG. 5, the device 1 comprises a thermal insulation chamber 18, 19 at each connection end. The volume of each thermal insulation chamber 18, 19 is delimited by tubular walls 12, 13 that extend longitudinally and are spaced apart transversely. A first end of the volume of each thermal insulation chamber 18, 19 located at the connection end is open, the opposite second longitudinal end being closed. The open first ends of the two thermal insulation chambers 18, 19 are configured to be fluid-tightly connected to one another and to form a single fluid-tight, closed insulation volume when the connection ends are coupled. This insulation volume forms part of or may constitute all or part of the aforementioned dead volume 24.

Of course, the invention is not limited to the examples described above.

Thus, the purge system may comprise a purge line which is located at one of the ends of the device (for example at the male or female end in the case of such a geometry).

In addition, all or part of the purge system may be located at a distance from the connection ends via one or more tubes/capillaries or pipes (distance of one or more meters, for example).

As mentioned above, a temperature sensor 131 may be provided, the measurement of which can make it possible to detect excessively cold temperatures indicative of a leak in order to trigger a closure of the sets of valves.

The solution has numerous advantages: it enables simple and effective purging of the dead volume 24 before the opening of the valves. This limits the ingress of contaminants and their deposition on the internal sensitive parts (notably frost/ice). The device and its use enable monitoring of the tightness of the connection before the opening of the valves. This makes it possible to avoid leaks to the outside which may be dangerous. In addition, the system enables monitoring of the tightness of the valves after their closure, before the separation of the ends.

The device is therefore particularly advantageous for devices for transferring noble or dangerous gases.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A self-closing emergency coupling and release device for the transport of cryogenic fluid, comprising two fluid transport pipes extending in a longitudinal direction and each comprising, at a connection end, a valve mechanism configured to automatically close the pipe when the connection ends are separated and to open the pipe when the connection ends are coupled, an outer tube that is disposed around each transport pipe and defines a space under vacuum for thermal insulation of the transport pipe, the device being configured to delimit a determined fluid-tight dead volume between the coupled connection ends, and a system for purging the dead volume, the purge system comprising a fluidic circuit fluidically connected to said dead volume, wherein the fluidic circuit of the purge system comprises a transfer pipe having an end leading into the dead volume, at least one reservoir of pressurized purging and/or inerting gas connected to the transfer pipe and configured to supply gas to the dead volume, the purge system comprising a gas discharge means for the gas, and wherein, when the connection ends are fluid-tightly coupled with the valve mechanism closed, the purge system is configured to purge the dead volume via the gas discharge means.

2. The device of claim 1, wherein the gas discharge means comprises at least one element selected from the group consisting of: a vent connected to a recovery zone, a system for evacuating the dead volume, a gas analysis unit, and a fluid transfer channel comprising an end leading into said dead volume.

3. The device of claim 1, wherein the fluidic circuit of the purge system comprises a safety valve configured to discharge any overpressure beyond a determined threshold in the dead volume.

4. The device of claim 1, wherein the fluidic circuit of the purge system comprises a pressure sensor and/or a spectrometer.

5. The device of claim 1, wherein, after purging of the dead volume via the gas discharge means, the purge system is configured to fill the dead volume with pressurized gas from the gas in the reservoir and then measure the leakage rate and/or the pressure of the dead volume.

6. The device of claim 5, wherein the purge system is configured to pressurize the dead volume with inert gas from the reservoir.

7. The device of claim 1, wherein the dead volume is located between the fluid-tightly coupled connection ends of the transport pipes and the fluid-tightly coupled outer tubes.

8. The device of claim 1, further comprising a thermal insulation chamber at each connection end, the volume of each thermal insulation chamber being delimited by tubular walls that extend longitudinally and are spaced apart transversely, a first end of the volume of each thermal insulation chamber located at the connection end being open, the opposite second longitudinal end being closed, the open first ends of the two thermal insulation chambers being configured to be fluid-tightly connected to one another and to form a single fluid-tight, closed insulation volume when the connection ends are coupled, this insulation volume forming part of or constituting the dead volume.

9. The device of claim 1, wherein the dead volume has a volume of between 1 and 1000 cm$^3$.

10. A method for purging the coupling device of claim 1, comprising the following steps:

> fluid-tightly coupling connection ends with the valve mechanism closed, then
>
> purging the dead volume via a discharge means for pressurized gas contained in the dead volume toward a vent and/or pumping gas into the dead volume, then
>
> filling the dead volume with a purging gas.

11. The method of claim 10, wherein the purging and filling steps are repeated thereby carrying out several expansion/compression cycles in the dead volume.

12. The method of claim 10, further comprising a step of pressurizing the dead volume to a determined level during filling and a step of measuring the tightness of the dead volume and, in the event of measurement of a tightness greater than a threshold, opening the sets of valves to transfer the fluid.

13. A method for purging the coupling device of claim 1, comprising the following steps:

> closing the sets of valves of the fluid-tightly coupled connection ends, then
>
> purging the dead volume via a discharge means for pressurized gas contained in the dead volume toward a vent and/or pumping gas into the dead volume, then
>
> measuring the tightness of the dead volume.

14. The method of claim 13, wherein, when the tightness is greater than a determined threshold, the method comprises the following steps:

> inerting the dead volume by venting the dead volume and/or filling the dead volume with an inert gas,
>
> separating the connection ends.

\* \* \* \* \*